Dec. 27, 1938.  F. L. O. WADSWORTH  2,141,425
METHOD AND APPARATUS FOR FEEDING MOLTEN GLASS
Filed March 21, 1934  4 Sheets-Sheet 1
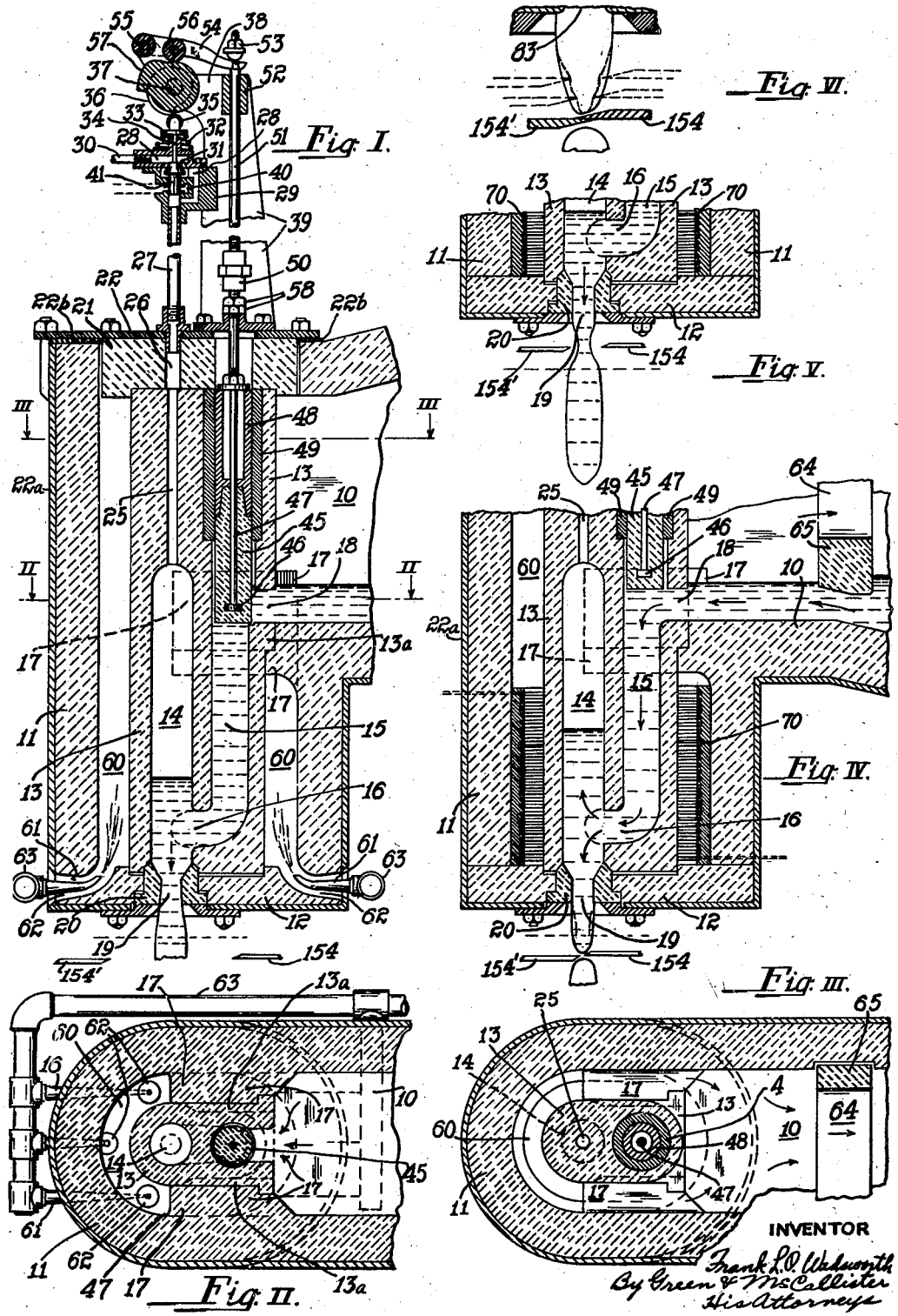
INVENTOR
Frank L. O. Wadsworth
By Green & McCallister
His Attorneys

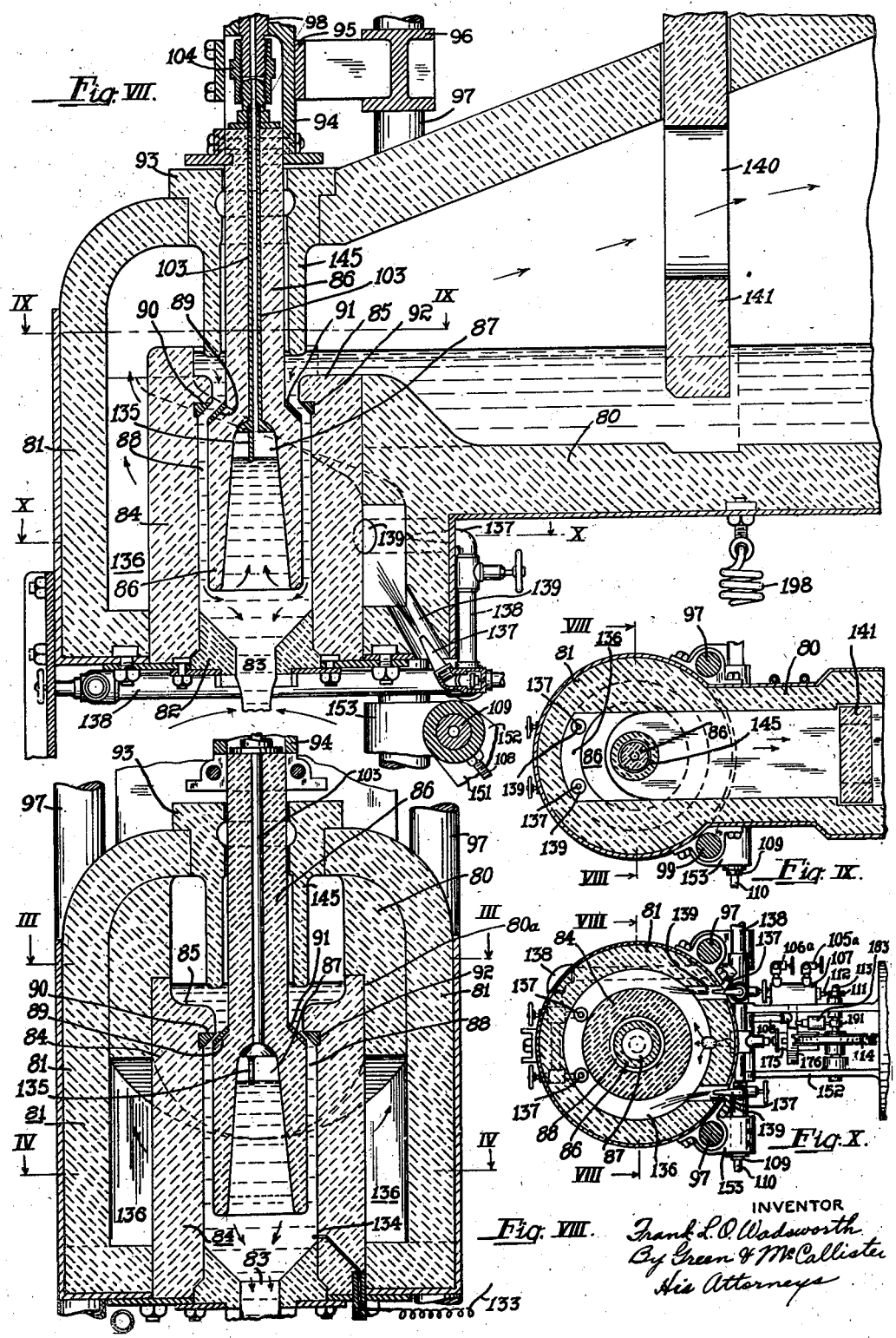

Dec. 27, 1938.  F. L. O. WADSWORTH  2,141,425
METHOD AND APPARATUS FOR FEEDING MOLTEN GLASS
Filed March 21, 1934  4 Sheets-Sheet 3
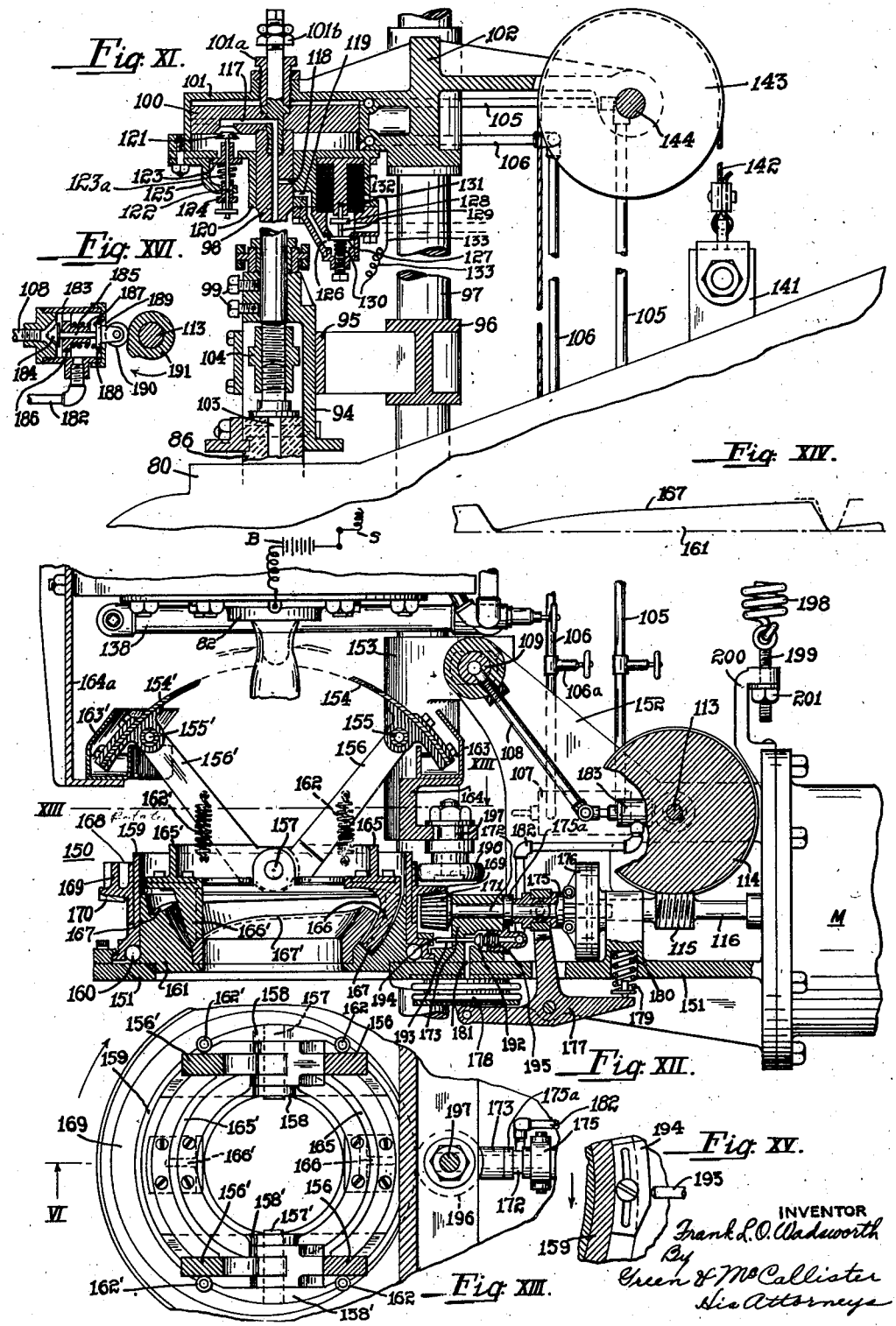
INVENTOR
Frank L. O. Wadsworth
By
Green & McCallister
His Attorneys Dec. 27, 1938.  F. L. O. WADSWORTH  2,141,425
METHOD AND APPARATUS FOR FEEDING MOLTEN GLASS
Filed March 21, 1934   4 Sheets-Sheet 4
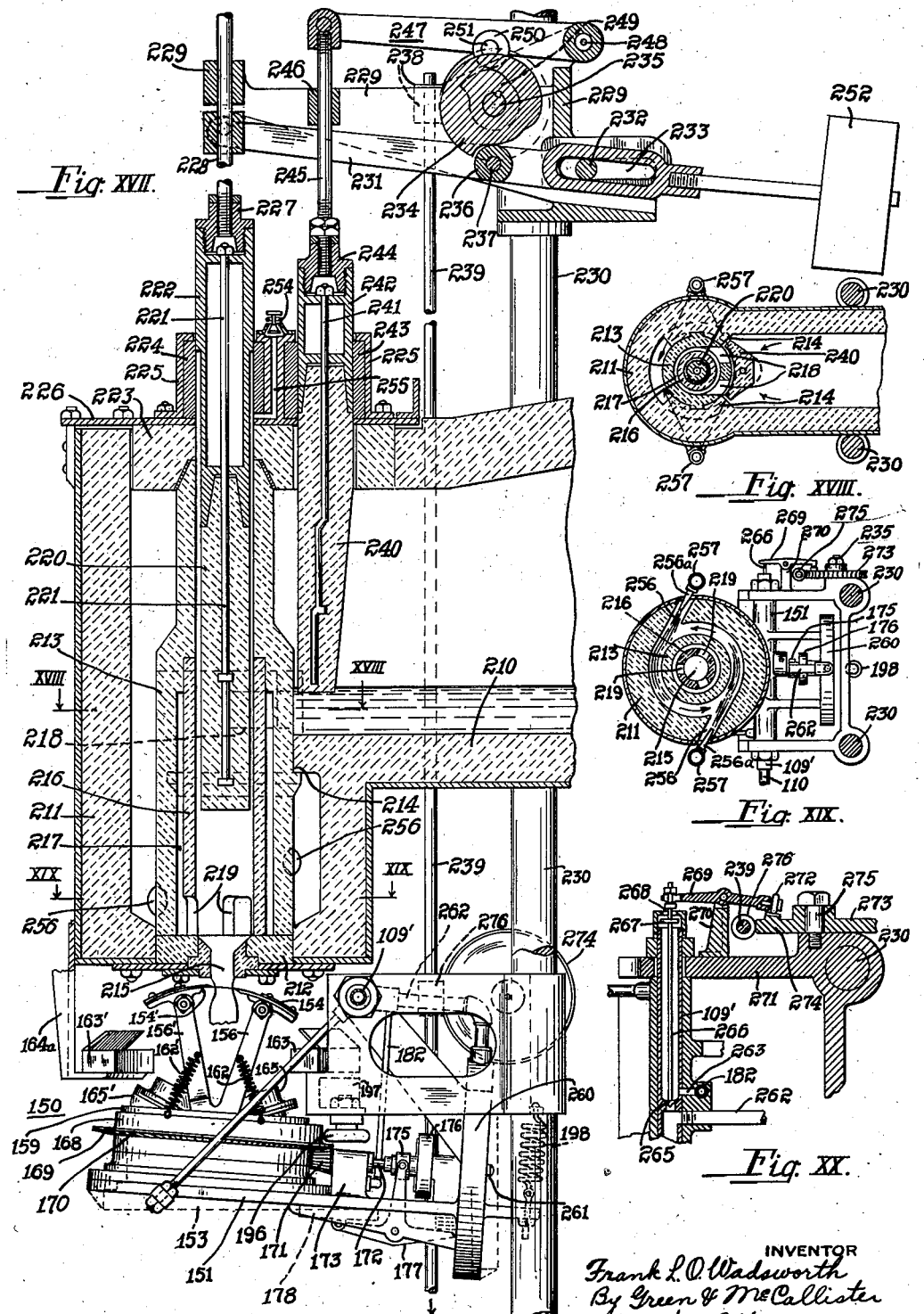

Patented Dec. 27, 1938

2,141,425

UNITED STATES PATENT OFFICE 2,141,425

METHOD AND APPARATUS FOR FEEDING MOLTEN GLASS

Frank L. O. Wadsworth, Pittsburgh, Pa., assignor to Ball Brothers Company, Muncie, Ind., a corporation of Indiana Application March 21, 1934, Serial No. 716,627

18 Claims. (Cl. 49—55)

This invention relates to the art of feeding molten glass—and more particularly to an improved method and apparatus for feeding molten glass in a continuously flowing stream—and of producing a regular recurrent series of enlarged stream sections having a definite shape and contour which are adapted to be cut off in succession from the stream and delivered in rapid succession to the forming machine.

The principal object of my invention is to provide a forced flow feeder of the pneumatic impulse type which may be effectively operated at a high speed without the use of any vacuum or suction action and which will, therefore, avoid such loss of time, and the resultant decreased rate of discharge, as results from the retarding action of a vacuum or partial vacuum when the same is employed to control or to partially control delivery from the feeder.

Another object of this invention is the provision of a single action or uni-directional impulse feeder in which the material above and in communication with the feed orifice is always subjected to a positive extrusion pressure or expulsion force, and in which such pressure or force is periodically varied as to intensity, thus producing a continuous but pulsating discharge of the molten substance, or a discharge at alternately accelerated and decelerated velocities of flow, and such as will produce a regularly recurrent series of enlarged stream sections of predetermined volume and shape that may be cut off in succession from the continuously flowing stream and delivered to the molds of a forming machine as a rapid succession of separate charges.

A further object is to produce a feeder for molten glass which will not only increase the number of formed mold charges delivered from a single orifice per unit of time but will also reduce the time each such mold charge is exposed to the cooling effect of the surrounding atmosphere during the period of its formation and delivery to a forming machine.

A still further object is to provide means for producing a continuous and stream-like discharge of molten glass by the combined complementary action of gravity and a regularly varied and automatically controlled super-atmospheric pressure which coact to produce a series of stream sections of predetermined volume and contour; and for successively severing these formed sections from the oncoming stream of glass without retarding or interfering with its free discharge flow in response to the combined gravity-pressure action.

Still another object is to provide a shear or severing mechanism which will effect a proper cutting off of the preshaped stream sections at the desired intervals, with the minimum disturbance or distortion of the surface contour of the flowing material and with the minimium chilling of the portions thereof engaged by the severing elements.

A still further object is the formation and delivery of the stream of molten glass under a gravity pressure or head which is greatly in excess of that obtained in the usual forehearth and flow boot construction. The attainment of this object is effected by providing a sub-forehearth member which extends a substantial distance below the floor of the main forehearth and which is maintained at a predetermined constant temperature by individually controlled heating means, whereby the physical characteristics of the glass in the immediate proximity of the flow orifice at the bottom of this sub-forehearth may be easily regulated independently of the conditions existing in the parent body of molten material.

A still further correlative feature of my improvement is to periodically supplement the increased gravity action last referred to by a relatively high air pressure on the material in the sub-forehearth and thereby obtain a substantially accelerated rate of discharge from the flow orifice—as compared with that obtainable with the usual forms of forced flow feeders of either the reciprocating plunger or the vacuum-pressure type—for the joint purpose of increasing the rapidity with which the expanded portions of the stream sections are formed and consequently the rapidity of forming successive mold charges and of severing the same and delivering them to successive or separate molds.

A still further purpose of the invention is to periodically feed a mass of molten glass to the sub-forehearth delivery chamber under the action of a relatively high gravity pressure or head, and to prevent the return flow of the material from the sub-forehearth chamber to the main supply body while under the complemental action of the periodically applied air pressure.

These and other objects which will be hereinafter made readily apparent to those skilled in this particular art are accomplished by means of the invention described in the following specification and illustrated in the accompanying drawings, wherein:

Figure I is a vertical section taken through the flow orifice of an apparatus for carrying out my invention;

Fig. II is a horizontal section taken on line II—II of Fig. I.

Fig. III is another horizontal section taken on line III—III of Fig. I;

Fig. IV is a vertical section through the flow orifice of an apparatus similar to that shown in Fig. I having the parts in position to permit a free flow of glass from the forehearth to the sub-forehearth with modified means for maintaining the glass in the sub-forehearth at the desired working temperature;

Fig. V is a sectional view illustrating the shape of the stream after air pressure has been applied to the molten glass in the sub-forehearth to expand and stuff the gob;

Fig. VI is a view illustrating the movement of the shear mechanism in severing the stream of glass;

Fig. VII is a vertical section taken through the flow orifice of another apparatus for carrying out my invention;

Fig. VIII is a transverse sectional view through the orifice of the apparatus illustrated in Fig. VII;

Fig. IX is a horizontal section taken on line IX—IX of Fig. VII;

Fig. X is a horizontal section taken on line X—X of Fig. VII;

Fig. XI is a view in vertical section on the same line as Fig. VII, and shows that portion of the apparatus which is above the apparatus illustrated in Fig. VII;

Fig. XII is a view in vertical section of a shear mechanism for severing the continuous flowing stream at the point of reduced cross section;

Fig. XIII is a horizontal section taken on line XIII—XIII of Fig. XII;

Fig. XIV is a projection of the cam surfaces employed in closing the shear blades;

Fig. XV is an enlarged view illustrating a detail of the shear closing mechanism;

Fig. XVI is an enlarged sectional view illustrating the valve controlling the operation of the shear mechanism;

Fig. XVII is a view in vertical section taken on a longitudinal plane through the flow orifice of another apparatus embodying a modification of my invention; the mechanism for shearing the stream being in elevation and illustrating the position of the parts at the time the blades start the severing action;

Fig. XVIII is a view in horizontal section taken on line XVIII—XVIII of Fig. XVII;

Fig. XIX is a horizontal sectional view taken on line XIX—XIX of Fig. XVII; and

Fig. XX is an enlarged sectional view illustrating apparatus for controlling the operation of the shear mechanism illustrated in Fig. XVII.

Referring to the form of construction shown in Figs. I to V, inclusive, 10 indicates a forehearth extension or boot of the usual type which extends out from the front of a glass melting tank or furnace (not shown) and is equipped with burners in the usual manner. The forehearth 10 terminates at its outer end in a sub-forehearth 11 having a floor 12 which is located a substantial distance below the bottom of the forehearth. Extending upwardly from the floor 12 of the sub-forehearth, is a refractory member 13 having therein a chamber 14 and a longitudinally extending passageway 15 which is shown parallel to the chamber 14 and in communication therewith adjacent the bottom of the member through a port 16. The member 13, as shown, is provided, intermediate of its ends, with a flanged portion 13a which is engaged by ledges 17—17 that project inwardly from the side walls of the forehearth 10, and form a partial roof for the sub-forehearth chamber. These flange and ledge portions 13a—17, form, with the member 13, a glass retaining dam at the front end of the main forehearth chamber and prevent the molten glass from flowing into the sub-forehearth enclosure, except through a valve controlled port 18 which leads to the upper end of the passageway 15. As a result of this construction, the molten glass in the forehearth 10 flows by gravity through the opened port 18 into the passageway 15 and thence through the port 16 into the chamber 14, which is open at its lower end and in constant communication with a delivery orifice 19 in a block 20 that is mounted in the floor 12 of the sub-forehearth. The area of the passageway 15 is considerably greater than the area of the orifice 19, and, due to the height of the column of glass in the passageway 15, a static head is maintained which not only causes the molten glass to flow in a continuous stream through the orifice 19 but also to rise to a substantial height in the chamber 14.

The member 13 is positioned as a unit in the sub-forehearth and is held in place therein by a block 21 which fits over the top of the member and forms a part of the roof of the main forehearth 10. The block 21 is held in place by a plate 22 which is bolted to the metal frame or jacket 22a that supports the entire forehearth and sub-forehearth assembly. To prevent the escape of hot gases of combustion, the space between the lower face of the plate 22 and the adjacent surfaces of the forehearth roof is filled with a soft packing 22b of asbestos, or asbestos clay cement, which seals the opening around the edges of the block 21.

In order to periodically accelerate the gravity flow of molten glass through the orifice 19 and thus produce a stream having a regularly recurrent series of enlarged portions of predetermined size and shape, an extruding or expelling force is periodically applied to the top of the molten material within the chamber 14, which accelerates the flow through the orifice and swells or expands the stream discharging therethrough. To apply such an accelerating force to the molten glass, in the chamber 14, a suitable elastic fluid, such as compressed air, is introduced into the chamber 14 at regular intervals, through communicating passageways 25 and 26 in the co-engaged members 13 and 21, which are connected by means of a pipe 27, a passageway 28 in a valve housing 29 and a pipe 30 to a suitable source of air under pressure.

The admission of air to the interior of the chamber 14 is controlled by a valve 31 which is mounted in the housing 29 and normally closes the passageway 28. The valve 31 is held in its closed position by a spring member 32 which is positioned between the top of the housing 29 and a collar 33 that is mounted on the upper end of a stem 34 extending upwardly from the valve 31. The valve 31 is periodically opened by a cam 36 which is mounted in a shaft 37, and which engages a cam roller 35 carried by the valve collar 33. The shaft 37 is mounted in bearings 38 on a forked arm support 39 that extends upwardly from the roof of the forehearth 10 and is continuously driven in a clockwise direction by a suitable motor (not shown).

From this construction, it is apparent that the cam 36 periodically depresses valve stem 34, opens the valve 31 and connects the interior of the chamber 14 with the source of compressed air, (the conduit 30) which forces the glass therefrom and accelerates its flow through the orifice 19. To reduce the pressure in the chamber 14 when the valve 31 is closed and permit the molten glass to flow rapidly into and fill the chamber 14, a passageway 40, communicating with the pipe 27, is provided in the housing 29, which is open to atmosphere, or if desired may be connected to a vacuum when the valve 31 is closed. When the valve 31 is opened to admit compressed air into the interior of the chamber 14, the passageway 40 is closed by the cylindrical extension 41 of the valve 31.

In order to obtain the full effect of the accelerating pressure in expelling the molten glass in the chamber 14 through the orifice 19, and prevent it from being forced back through the passages 16 and 15 into the forehearth 10, a plunger valve is reciprocably mounted in the upper part of the passageway 15 and is adapted to be lowered to close the port 18, when the interior of the chamber 14 is connected to the source of compressed air, and raised to open the port when the chamber is connected to atmosphere. The plunger comprises a refractory plug 45 which is supported on the flanged head 46 of a rod 47 the upper end of which is bolted to a metallic sleeve 48. The sleeve 48, which is made of a suitable high heat resisting alloy is slidably mounted in a graphite bearing 49 positioned in the upper end of the passageway 15 and is connected, through the rod 47 and coupling 50 to a rod 51 which is slidably journaled in a cross bar 52 at the upper end of the forked support 39. To raise the plunger 45 when the valve 31 is closed and the chamber 14 is open to atmosphere and permit the glass in the forehearth to flow through the port 18, the upper end of the rod 51 above the crosshead 52 is provided with an adjustable nut 53 which is adapted to be engaged by the slotted end of an arm 54 which is carried by the shaft 55 journaled in the support 39. The arm 54 carries a roller 56 which rides on a cam 57 on the continually driven cam shaft 37. The cam 56 is arranged to raise the arm 54 and the plunger 45 and open the port 18 each time the cam 36 permits the springs 32 to close the valve 31. When the valve 31 is opened by the cam 36, the cam 57 releases the arm 54 and the plunger is allowed to fall by its own weight and close the port 18.

In order to further adjust the length of travel of the plunger 45, a pair of adjustable lock nuts 58 are threaded on the rod 47 for limiting the downward movement thereof.

In order to maintain the glass in the passageway 15 and chamber 14 at the desired working temperature, the outer surface of the member 13 is spaced from the walls of the sub-forehearth to form therebetween a heating chamber 60, into which combustible fuel is introduced through nozzles 61 extending through ports 62 in the walls of the sub-chamber 11. The nozzles 61 are connected to a pipe 63 leading to a suitable and independent source of fuel.

To utilize the products or gases of combustion for the purpose of heating the glass in the forehearth,—and also to avoid the use of special chimney flues for conducting away these burner gases—the upper end of the chamber 60 is placed in communication with the main forehearth chamber 10 (as shown in Fig. III); and the gases passing into this enclosure are conducted back into the main tank chamber through a window opening 64 in the baffle wall or gate 65, which controls the flow of glass from the furnace, from which they are discharged through the furnace stack.

In Fig. IV I have shown another means for maintaining the glass in the sub-forehearth at any desired working temperature. In this modification an electrical heating element 70, which is connected to a suitable source of current, is positioned in the heating chamber 60, and may be controlled, in any suitable manner, for the purpose of maintaining the glass in the delivery boot in the best condition for operation.

When the apparatus shown in Figs. I—V, inclusive, is in operation and the chamber 14 connected to atmosphere, the cam 57 is in engagement with and holds the arm 54 and the plunger 45 in their raised position. Glass is then flowing under the influence of gravity from the forehearth through the port 18 into the passageway 15 and is discharging from the orifice 19. Since the area of the passageway 15 is considerably greater than the area of the orifice 19, and since a column of glass is always maintained in the passageway 15, the glass passing through the port 16 is under such a static head pressure as will cause it to flow into and rapidly rise in the chamber 14 as well as to flow through the orifice 19 in a continuous stream. When the glass in the chamber 14 has reached a predetermined level, the cam 57 releases the arm 54 and the plunger 45 is allowed to drop due to its own weight, and close the port 18. At the same time the cam 36 depresses the valve stem 34 and opens the valve 31 admitting compressed air into the chamber 14 to accelerate the flow of glass through the orifice 19. This accelerated flow expands or swells the stream flowing through the orifice and since the port 18 is closed, the glass in the passageway 15 is prevented from being forced back into the forehearth 10. After the glass has been subjected to the accelerating force for a predetermined time, the cam 36 releases the stem 34 and permits the spring 32 to close the valve 31 and connect the interior of the chamber 14 to atmosphere. At the same time the cam 57 raises the arm 54 and the plunger 45 connected thereto, and opens the port 18 so that glass is again flowing into the passageway 15.

From this construction it is apparent that as a result of maintaining a large quantity of glass in the passageway 15, there is always a continuous flow through the orifice under the influence of gravity and at regular intervals, this flow is subjected to a supplemental expulsion force, which acts to accelerate the gravity flow; and as a result, a continuous pulsating discharge is produced at alternately accelerated and decelerated velocities of flow. The flow of glass through the orifice is never arrested or retarded, but due to the decelerated velocity of flow,—that is, the velocity of the flow under the influence of gravity alone,—there is a "natural necking" of the glass which produces a stream of regularly recurrent enlarged and reduced sections of predetermined shape and size. Further, by having the glass above the orifice under a relatively high static head the gravity flow is considerably faster than in the ordinary type of natural flow feeder in which the glass is under a relatively small static head pressure.

In Figs. VII, VIII, IX, X, and XI, I have shown another form of apparatus for carrying out my improved method of feeding a stream of molten glass at a high rate of speed and in the shape of regularly recurrent series of enlarged sections. In this construction, 80 indicates the forehearth extension which extends out from the front of a glass melting furnace or tank and terminates in a sub-forehearth 81 on the outer end thereof. The floor of the sub-forehearth which is located a substantial distance below the bottom of the forehearth 80 has a block 82 mounted therein which is provided with a delivery orifice 83 through which glass is adapted to be continuously discharged. Surrounding the floor block 82 and extending upwardly from the floor of the sub-forehearth 81 is a sleeve member 84 made of suitable refractory material, the upper end of which is engaged in recesses 80a in the thickened side walls at the front end of the main forehearth. The upper end of the sleeve 84 is also provided with a notch or gate 85 at its rear or furnace side to permit the glass to flow from the forehearth to the delivery orifice 83.

In order to control the flow of glass through the gate 85, a refractory bell member 86 having a chamber 87 therein is reciprocatably mounted in the forehearth assembly 80—81 with its lower end extending into the sleeve member 84. The external diameter of the member 86 is substantially smaller than the internal diameter of the sleeve 84, so that an annular passageway 88, is formed therebetween, which is of considerably larger area than the area of the orifice 83. As a result of this difference in area, the glass flowing through the passageway, 85, will be delivered to the interior of the sleeve 84 at a higher rate of speed than it can be discharged through the orifice 83, and will therefore flow into and rapidly rise in the chamber 87.

When the molten glass has reached the desired level within the chamber 87, the member 86 is raised to bring an annular shoulder 89, on the outer surface of the bell 86, into close proximity to an inwardly projecting annular shoulder 90 on the inner surface of the sleeve 84 for the purpose of throttling the passageway 88 and substantially arresting any flow of glass through the passageway 85.

In order to prevent the refractory sleeve 84 and the refractory member 86 from chipping and wearing away, I prefer to cover the shoulders 89 and 90 with liners 91 and 92, which may be made of a suitable non-corrosive and high heat resisting metal or alloy.

For the purpose of permitting the member 86 to be periodically raised and lowered, the reduced upper end thereof is extended through an opening in a block 93 (which forms a part of the roof of the main forehearth), and is clamped to the lower end of a collar 94 that is slidably mounted in a bearing 95 on a crosshead 96, which extends between upright posts 97 that support the forehearth and sub-forehearth on the front of the main furnace or tank.

The upper end of the collar 94 is secured to the end of a tubular rod 98 with set screws 99 (see Fig. XI); and the upper end of this rod is fastened to a piston 100 which is slidable in a cylinder 101, that is supported by a crosshead 102 mounted on the posts 97—97. The lower end of the tube 98 is connected, by the right and left hand coupling 104, to the upper end of a tube 103 extending through the member 86 and opening into the chamber 87. To move the piston 100 up and down in the cylinder 101—for the purpose of raising and lowering the member 86—compressed air is alternately admitted to the opposite ends of the cylinder through pipes 105 and 106, leading to a double-action timer valve cylinder 107 that is continually supplied with compressed air through a pipe 108 leading to a hollow mandrel 109 that is connected to a suitable source of motive fluid by a pipe 110. The timer valve assembly is of the usual well known piston type, which is operated by a cam 111 that is secured to a cam shaft 113; and is driven at a controllable speed through a worm gear 114 on the cam shaft, and a worm 115 on the armature shaft 116 of a suitable motor M.

In order to accelerate the flow of glass through the orifice 83 at the time when the member 86 is in its raised position, an external expelling force is applied to the molten glass in the chamber 87 to periodically supplement the action of gravity in expelling the glass therefrom through the orifice, and to thereby swell or "stuff" the flowing stream to form a series of expanded and pre-shaped mold charge sections. This supplemental extrusive action is conveniently obtained by providing the piston 100 with a passageway 117 which communicates with the interior of the tubular rod 98, and through which compressed air may be delivered to the chamber 87 where the connected members 86—94—98—100 have been raised by the admission of the motive flow to the lower end of the cylinder 101.

When the bell member 86 is lowered, the passageway 117 is closed by a valve 121 which is adapted to engage and seat against the lower side of the piston 100 when the latter is moved to its lower position to open the passageway 88. This valve 121 is attached to a stem 122 which is threaded through the hub of another valve element 123 that is adapted to control a port opening in the lower head of the cylinder 101, and is slidably mounted in an adjustable screw 124 that is carried by a bracket 125 on this head. The connected valve elements 121—123 are normally held in their raised position (shown in Fig. XI) by a coil compressing spring 123a which is interposed between the valve 123 and the upper end of the screw 124. When the piston 100 is moved downwardly in the cylinder for the purpose of opening the passageway 88, the valve 121 seats over and closes the passageway 117; and if the valve engages with its seat in the piston before the latter reaches the lower limit of its travel, the further movement of the piston moves the valve assembly downwardly against the action of the spring and opens the lower end of the cylinder 101 to the atmosphere.

When the member 86 is moved to its lowermost position and the passageway 88 is open, a direct communication is also established between the bell chamber 87 and the atmosphere, through a port 118 in the side of the tubular rod 98, and a port 119 in the lower cylinder head and the air in the chamber 87 is then permitted to escape through a passageway 126 which leads from the port 119 to the external air or to a suitable source of sub-atmospheric pressure, (as indicated by the dotted lines in Fig. XI), as may be desired. As a result of establishing this connection, the pressure in the chamber 87 is immediately relieved and the glass is permitted to flow readily into the chamber 87 under the influence of gravity.

In order to prevent the molten glass in the bell chamber 87,—the top of which is below the free surface of glass in the forehearth 80,—from rising above the level of the end of the tube 103, I provide means for trapping a quantity of air in the said chamber when the glass has reached a predetermined level therein, and thus preventing the further flow of glass to the interior of the bell. This is accomplished by providing a disc valve 127 which is disposed in the passageway 126 and which is adapted to close the said passageway when the glass in the chamber approaches the desired predetermined level. The valve 127 is normally held in its open position to allow the free discharge of the air from the chamber 87, when the ports 118 and 119 are first brought into communication with each other, by means of a weight 128, which is mounted on a valve stem 129 extending upwardly from the disc 127, and which is sufficiently heavy to overcome the lifting tension of a spring 130 positioned beneath the disc 127. The upper end of the valve stem 129 extends into an opening 131 in the core of a solenoid 132, one terminal of which is connected, by a heavily insulated wire 133 and the battery B to a terminal 134 extending into the molten glass adjacent the bottom of sleeve 84, while the other terminal is connected, by means of the metal parts 120, 98, and 103, with a terminal 135 extending downwardly from the lower end of the tube 103. When the molten glass has risen in the chamber 87 sufficiently to come in contact with the terminal 135 (Figs. VII and VIII) an electrical circuit is established which energizes the solenoid and lifts the weighted armature 128 of the disc valve 127 to close the passageway 126. The closing of this passage traps a quantity of air in the chamber 87, which is compressed by any further rise in the molten glass therein; and thus establishes a condition of equilibrium that will arrest any further gravity flow of the material into the chamber. As soon as the glass in the chamber 87 falls below the predetermined level, and drops out of contact with the terminal 135, the electrical circuit is broken; the solenoid 132 is deenergized; and the valve 127 is moved down by the armature weight 128 to reopen the passageway 126. In the usual operation of the feeder this downward movement of the valve 127 takes place after the piston rod 98 has been lifted to throttle and substantially close the glass supply port 88; but as will be hereinafter pointed out, the valve 128 may be opened at any time regardless of the position of the ports 118 and 119 to each other.

In order to maintain the glass in the member 84 at the desired working temperature, the outer surface of the member is spaced from the inner surface of the sub-forehearth 81 to form therebetween a combustion chamber 136, into which a combustible fuel is introduced through nozzles 137 which lead from a suitable fuel line 138 and extend through openings 139 in the floor and side walls of the sub-forehearth. The hot gases of combustion pass upwardly in the combustion chamber 136 around the member 84 and into the forehearth 80, as shown in Figs. VII, VIII, and X; and are then discharged into the main glass furnace through an opening 140 in the movable baffle block 141 which controls the flow of glass from the tank into the forehearth.

The baffle block 141 extends through an opening in the roof of the forehearth 80, and is supported in the desired position by a wire cable 142, which is carried up over a pulley 143, mounted on a shaft 144 supported by the crosshead 102, and is attached to a counterweight (not shown); so that the baffle block may be easily raised or lowered to control the flow of glass into the forehearth.

To prevent the hot gases from escaping from the forehearth, adjacent the member 86, the roof block 83 is provided with a depending annular flange 145 which projects downwardly into the molten glass and forms therewith a liquid seal that prevents the gases of combustion within the forehearth chamber from coming in contact with the member 86.

The operation of this construction is as follows: With the parts in the position shown in Fig. VII, molten glass is flowing, under the influence of gravity, through the notch or gate 85, into the passageway 88, and is being discharged through the delivery orifice 83. Since the area of the passageway 88 is considerably greater than the area of the orifice, and since the static pressure in the passageway is relatively high, the molten glass also flows into and rapidly rises in the chamber 87. When the glass reaches a predetermined level in the chamber 87, the cam 111 is adapted to actuate the timer valve in the cylinder 107, and connect the pipe 106, leading to the underside of the piston 100, to the source of compressed air. As the piston 100 moves upwardly the member 86 which is connected thereto is also raised and the shoulder 89 is moved into close proximity to the shoulder 90 thereby shutting off the flow of glass through the passageway 88. As the piston 100 is being moved upwardly, the port 118 is moved out of registration with a port 119; and at the same time, the valve 121 is unseated to permit the compressed air in the cylinder 101 to flow through the passageway 117 into the chamber 87, and subject the glass therein to an added force which materially accelerates the natural gravity flow from the delivery orifice 83, and swells, or increases the volume of the issuing stream.

If, however, the glass in the chamber 87 should reach the predetermined level before the cam 111 is in position to connect the underside of the piston 100 with the source of compressed air, the glass rising in the chamber will come in contact with the terminal 135 and establish an electrical circuit which will energize the solenoid 132 and close the valve 127 whereby a quantity of air will be trapped in the chamber 87 and will prevent the glass from rising materially above the first contact level. As soon as the piston 100 has been raised and the level of glass in the chamber drops or is forced out of contact with the terminal 135 the solenoid 132 is deenergized and the passageway 126 is again opened. But, it is obvious that the solenoid may also be deenergized, and the passageway 126 opened at any time, regardless of the position of the cam 111, by means of a break switch S in the battery line 133.

When the required quantity of glass has been forced out of the chamber 87, the constantly revolving cam 111 acts to again operate the timer valve in the cylinder 107, and connect the pipe 105 to the source of compressed air—thereby admitting motive fluid to the top of the cylinder 101—and concurrently connect the pipe 106 to an atmospheric vent port. The superior pressure on the upper side of the piston 100 will then move the connected members 98—94 downwardly and reopen the glass supply passage 88. As some point intermediate the beginning and end of its downward stroke the piston engages the valve 121 and closes the passageway 117 which shuts off the flow of air from the lower end of the cylinder 101 to the interior of the chamber 87. As the piston 100 continues its downward movement the ports 118—119 are brought into registry and the interior of the bell chamber 87 and is then directly connected to the atmosphere or to a source of subatmospheric pressure (as previously indicated) and glass is permitted to flow freely into the said chamber, either under the influence of gravity alone, or under the joint influence of gravity and a partial vacuum.

From this construction, it is apparent that the molten glass within the chamber 87 is not subjected to the full effect of the supplemental extruding or expelling force until the passageway 88 is substantially closed; and that when this supplemental force is applied, the glass in the chamber is prevented from being forced back into the pool of glass within the forehearth; and the resultant flow through the delivery orifice is greatly increased. Also, since the interior of the chamber 87 is not directly connected to atmosphere or to a vacuum,—by the registration of the port 118 with the port 119—until the passageway 126 has been fully opened, there is always a gravity flow through the orifice 83 which is not, at any time arrested or retarded, but which is periodically accelerated by the supplemental expelling force; and a stream of alternate enlarged and of reduced cross sectional areas is produced which is adapted to be severed at the points of reduced cross sections to form individually preshaped mold charges or gobs.

It is also apparent that the alternate admission and escape of air through the pipe connection 106—which acts to raise the piston—bell assembly, 100—86, and also control the flow of motive fluid to the bell chamber—can be controlled by the throttle valve 106a (Fig. XII); so as to regulate both the speed of lift and the speed of drop of the movable members; and that the extent or range of this movement may also be regulated by the stop screw 101a in the upper head of the cylinder 101, and by the adjustable lock nuts 101b on the upper end of the piston rod 98. It is further possible to limit the expelling pressure on the glass in the bell chamber—independently of the pressure in the supply line 110—by means of the relief valve 123 which can be adjusted to open at any predetermined pressure by turning the sleeve screw 124 and thereby changing the tension of the spring 123a. It is also possible to change the point at which the expelling pressure is first applied to the glass by moving the valve element 121 up or down with respect to the valve element 123; this being accomplished by turning the valve stem 122 in the threaded hub of the valve 123.

To sever the stream at the point of reduced cross sections to form a series of successive mold charges of predetermined shapes and sizes, a suitable high speed shear mechanism 150 (Figs. XII, XIII, XIV, XV, XVI, XVII, and XX) is mounted below the sub-forehearth. This shear mechanism is preferably of such construction as to effect the severance, by a concurrent transverse and axial movement of the cutting elements, so as to avoid any tendency to interrupt or retard the free downward flow of the material, and likewise prevent any piling up and chilling of the molten glass in the shear blades. The shear mechanism here illustrated is supported, as a whole, on a frame or base plate 151 that has vertically disposed side plates 152—152 attached to one end of the frame (right hand end as shown in Fig. XII) and whose upper ends are journaled on the hollow mandrel 109, which is located above and to the left of the portions of the plates secured to the frame 151. The mandrel is, in turn, supported in brackets 153—153 on the upright rods or columns 97—97. The frame 151 also carries the motor M and the weight of the motor M, the shear mechanism 150, and the other elements carried thereby is so distributed thereon that the frame has a tendency to turn about the mandrel 109 in a clockwise direction and move the shear mechanism 150 toward the bottom of the forehearth 80. This movement of the frame 151, in a clockwise direction, is resisted and counteracted by a spring 198 which is positioned between the forehearth and the frame 151, and which is so adjusted that it tends to turn the frame in the opposite direction. Movement of the frame 151 by the spring 198, however, is prevented by an eccentric hub 169 on a gear sleeve 168—170 which bears against a fixed roller 196. The purpose and function of this construction will hereinafter be more fully explained.

The shear mechanism 150 comprises a pair of opposed shear blades 154—154' of either the straight edge form or the usual cat's eye form, which are mounted on cross bars, 155—155' whose ends are rigidly secured in the upper terminals of the opposed pair of arms 156—156'. The lower ends of both sets of arms are coaxially journaled on stub shafts 157—157' that are rigidly supported in diametrically opposed portions 158—158' of an annular sleeve 159, which is rotatably mounted on a ball bearing 160 positioned between the sleeve and an inner cylindrical member 161, which is secured to the base plate 151.

The shear blade members 154—154' are normally held in their open position by tension springs 162—162' which are attached, at their upper ends to the arms 156—156', and are connected, at their lower ends to the sleeve 159; and when in their open position the outer portions of these blades are received in segmental trough-shaped boxes 163—163', one of which is supported on a crosshead 164 that extends between the brackets 152, and the other of which is supported on a bracket 164a that is attached to the frame of the sub-forehearth 81. These boxes 163—163' may be filled with a suitable liquid such as oil, which will serve both as a lubricant and as a cooling medium for the cutting elements.

The two cooperating pairs of shear blade arms, 156—156 and 156'—156'—which are pivotally mounted on the common stub shafts 157—157'—are respectively connected, at their lower or inner ends, by curved crossheads 165—165' of T-shape cross section; and each of these crossheads is provided with a depending finger (marked 166—166', respectively), which rides on a corresponding cam face 167—167', that are formed on the inner surface of the stationary annular member 161; so that as the sleeve 159 is rotated, the fingers 166, 166' will ride over these cam surfaces and rotate the connected arms about their pivot supports, to thereby first move the blades to their closed or severing position, and then allow them to be returned to their open position by the springs 162—162', etc. The developed form or contour of the cam surfaces 167—167' is illustrated in Fig. XIV.

In order to rotate the sleeve 159, for the purpose of actuating the shear blades in the manner just described, a collar 168 is secured to the outer surface of the sleeve 159 and is provided with a bevel gear 170 which is engaged with a pinion 171 on the end of a shaft 172. The shaft 172 is journaled in a bearing 173 carried on the frame 151, and is intermittently driven to periodically rotate the sleeve 159—by a friction clutch assembly 175—176, one element (175) of which is slidably keyed on the shaft 172 while the other element (176) is secured to the end of the continuously driven motor shaft 116.

The element 175 of the clutch is moved toward and away from the element 176, to respectively engage and disengage the clutch, by a bell crank lever 177, which is pivotally mounted on the frame 151, and has the upper end thereof coupled to the clutch element 175, by the usual collar connection. The other arm of this lever is flexibly coupled to the lower head of a metallic bellows 178 and is also engaged by a spring 179 which is mounted in a recess 180 in the frame. The bellows 178 is normally held in its expanded position to hold the elements of the clutch in disengaged position by compressed air, which is introduced therein through a passageway 181 that is connected, by a pipe 182, to the cylinder 183 of a timer valve assembly which is supplied with air through the pipe 108.

The detail construction of the last-mentioned timer valve member—which serves to periodically engage the elements 176 and 176' of the clutch,—is shown in detail in Fig. XVI. It comprises a double-headed valve element 184—188 which is adapted to be moved in one direction—to seat the head 184, and shut off the supply of air to the bellows 178, and at the same time unseat the head 188 and thus connect the bellows to atmosphere—by a cam 191 which is keyed to the continuously revolving cam shaft 113 (supra), and which engages with a cam roller 190 on the valve head 188; and is adapted to be moved in the reverse direction (to seat the valve head 188 and unseat the head 184) by a spring 187 which is interposed between the ported partition 186 and the head 188. As a result of this construction, it is seen that the periodic engagement of the raised portion of the cam 191 with the roller 190, momentarily closes the connection between the compression air line 108 and the pipe 182, and simultaneously opens the vent port 189, whereby the delivery of air to the bellows is shut off and the interior of the bellows is connected to atmosphere permitting it to collapse. On the collapse of the bellows 178, the spring 179 rotates the bell crank 177 and moves the clutch element 175 into engagement with the clutch element 176. As soon as the clutch elements are engaged, the sleeve 159 starts to turn and the fingers 166—166' immediately start to ride up on the cam surfaces 167—167' and advance the shear blades toward each other.

To prevent the elements 175 and 176 of the clutch from being moved apart or disengaged until the sleeve 159 has been turned through one complete revolution, and the shear elements have thus been closed and reopened, an auxiliary valve 192 is interposed in the passageway 181 for automatically closing the latter at the start of rotation of the sleeve, and keeping it closed until this movement is completed. This action is effected by means of an angularly adjustable cam 194 (see Fig. XIII) which is secured to the rotatable sleeve 159 in such position that when the sleeve is stationary (i. e., when the clutch elements 175—176 are disengaged) the valve 192 is held in its open position by the engagement of this cam with the outer end of the valve stem 193. But, as soon as the sleeve 159 starts to rotate, the cam 194 is moved out of contact with the valve stem 193 and the valve 192 is closed by the backing spring 195; and it remains closed until the sleeve has nearly completed its revolution, at which time the beveled end of the cam 194 again engages the valve stem 193 and moves the valve 192 to its open position, thus reconnecting the bellows 178 with the cylinder 183. Since the valve 184 is only momentarily closed by the cam 191, compressed air is now again admitted to the bellows 178, and the bellows are immediately expanded, to return the bell crank 177 to its initial position (as shown in Fig. XII) and thus disengage the clutch elements 175—176. To stop the rotation of the sleeve 159 as soon as the clutch elements are disengaged, the slidable element 175 of the clutch, is adapted to engage with a fixed collar 175a on the shaft bearing box 173, thereby applying a brake to the shaft 172 and bringing it to rest in such position that the fingers 166—166' drop into the depressed portion of the cam faces 167—167' (see Fig. XIV) and permit the shear blades to be retracted by the springs 162—162'.

In order to obtain a combined axial and transverse movement of the shear blades 154—154' during the severing operation, I have provided a roller 196 which is mounted on a stub shaft 197 that is carried by the crosshead 164, and which is so positioned on the crosshead that it is located in the arcuate path of travel of the eccentric hub 169 on the gear sleeve 168—170. When the connected sleeves 168—159 are rotated, the frame 152 is rocked on its mandrel support 109, by the engagement of the revolving eccentric hub 169 with the fixed guide roller 196 and by the action of the spring 198 which is attached to the bottom of the forehearth and the top of the frame 151 and which holds the moving member 169 against the fixed guide roller 196 due to the fact that it is positioned in the arcuate path of travel of the hub 169. To regulate the tension of the spring, the lower end thereof is secured to a threaded eye-bolt 199 which extends through a bracket 200 on the frame. A nut 201 is provided for moving the bolt 199 relative to the bracket.

The eccentric hub 168 is so shaped, and so positioned in relation to the cam surfaces 167—167' that, as the sleeve 159 revolves, the outer end of the frame 151 will first be moved upwardly toward the bottom of the forehearth and will reach its highest point at the time when the blades are just starting to enter the stream of glass (see dotted lines in Fig. XII). As the movement continues, the swinging movement is reversed, and the outer end of the frame moves downward to its original position; so that the blades move with the stream during the severing operation (as shown in Fig. VI). The cam surfaces 167—167' are also preferably so shaped that the time of contact of the cutting elements with the stream, the revolving shear assembly will revolve through at least one half a revolution; that is to say, the movement of the shear blades 154—154' from the full line position to the dotted line position of Fig. XII will be effected during the first half of the revolution of the sleeve 159; and, the cutting or severance of the glass will be effected during the last half of this movement.

The shear mechanism operates in timed relation with the expelling means and the two timer valve cams 191 and 191 are preferably so adjusted that the stream will be severed at the points of reduced cross sections between the enlarged portions produced by the periodic application of the supplemental expelling pressure to the glass above the delivery orifice; i. e., at the points where there is a natural necking in the stream due to the decreased velocity of delivery, under the action of gravity alone, when the supplemental force is removed.

To recapitulate: When the cam 191 engages the roller 190,—thereby closing the valve 184 and opening the valve 188—the bellows 178 will collapse; the spring 179 will engage the clutch elements 175 and 176; and the sleeve 159 will begin to move.

As the sleeve 159 starts to rotate, the fingers 166—166' ride up on the cam faces 167—167' and advance the shear blades 154—154' toward each other. At the same time, the engagement of the eccentric sleeve 168 with the roller 196 causes the frame carrying the shear mechanism to swing about the mandrel 109 and to lift the advancing blades toward the bottom of the sub-forehearth. As the blades start to enter the stream, the frame carrying the shear mechanism is swung downwardly so that the blades travel with the stream during the time they are in engagement therewith. The cam faces 167—167' are so preferably shaped that the final closing movement—during which the blades are in contact with the glass—requires at least one half of a complete revolution of the sleeve 159. As soon as the cut has been completed, the fingers 166—166' drop into pockets in the cam faces 167—167' and permit the shear blades to be quickly retracted by the spring members 162—162' and returned to their open position. When the sleeve 159 has been turned through approximately one complete revolution and just before the shear blades are retracted as stated, the cam dog 194 engages the valve stem 193 and unseats or opens the valve 192, thereby readmitting compressed air to the bellows 178 and disengaging the clutch elements 175 and 176 to stop the rotation of the shaft 172 and the sleeve 159. When the next gob or charge is to be severed from the stream, this cycle of operation is again repeated.

In Figs. XVII, XVIII, XIX, and XX, I have shown another embodiment of my uni-directional force feeder, and also a slightly modified form of rotating and "dropping" shear mechanism. In this third exemplification of my improvements, the molten glass is contained in a forehearth 210 having at the outer end thereof a sub-forehearth 211, the floor (212) of which is substantially lower than the bottom of the main forehearth. Positioned in the sub-forehearth 211 and extending upwardly from the floor thereof is a hollow refractory member 213 which is supported intermediate of its length on flanged ledges 214 extending outwardly from the side walls of the main forehearth. The refractory member 213 is positioned over an orifice 215 in the bottom of the sub-forehearth and is provided with an inner sleeve 216 which is spaced therefrom to form an annular passageway 217, whose cross sectional area is substantially greater than that of the orifice 215. The molten glass in the forehearth 210 flows by gravity through ports 218, in the side wall of the member 213, into the passageway 217, and then through the ports 219, in the bottom of the sleeve 216, and is discharged in a continuous stream through the orifice 215. Since the orifice 215 is of materially smaller area than the passageway 217, the flowing stream of glass will also tend to "back up" and rapidly rise in the chamber in the sleeve 216 under the effect of the gravity head of molten material in the upper forehearth chamber 210.

In order to periodically accelerate the gravity flow through the orifice, a refractory plunger 220 is reciprocably mounted within the sleeve 216, and is adapted to be periodically depressed to exert a supplemental extrusion force on the glass in the interior of the sleeve. The plunger 220 is mounted on a rod 221, and is connected at its upper end to a hollow sleeve 222 made of a suitable high heat resisting alloy. The sleeve 222 extends through an opening in a roof block 223 and is slidably engaged by a graphite bushing 224, which is mounted in a housing 225, that is supported on the roof plate 226. The upper end of the sleeve 222 is detachably coupled at 227, to a rod 228 which is reciprocably mounted in the front wall of a box shaped bracket frame 229, that is carried by the side posts 230 of the forehearth assembly.

When the flow of glass through the orifice is to be accelerated, the plunger 220 is moved downwardly to force the glass in the interior of the sleeve through the orifice and thereby swell the gob by increasing the rate of flow through the orifice. In the construction here illustrated, the plunger is actuated by a forked lever member 231, where the outer end is pivotally connected to a vertically adjustable collar on the plunger rod 228, and whose inner end is journaled on a stud bolt 232 that extends through a slot 233 in the lever 231 and is clamped in any desired position in a slotted extension of the rear wall of the bracket frame 229. The lever 231 is periodically forced downwardly to depress the plunger 220, by a cam 234 which is secured to a continuously revolving cam shaft 235, and which engages a roller 236 mounted between the forked arms of the lever. The cam shaft 235 is driven through a suitable worm gear (such as is shown in Fig. XIX), which is engaged by a worm 238 on a continuously driven motor shaft 239.

In order to prevent the glass in the chamber 217 from being forced back through the ports 218 into the forehearth when the plunger 220 is moved downwardly, I provide a suitable gate 240, of refractory material, which is positioned in front of these ports, and is automatically moved to substantially close them, at or about the time when the plunger starts its downward movement. In the construction here shown, the upper end of the gate 240 extends through an opening in the roof of the forehearth, and is suspended on a rod 241 which is embedded in the body of the gate and is clamped to a metallic sleeve 242 formed of a high heat resisting alloy. The sleeve 242 is slidably mounted in a graphite bearing 243 in the housing 225, and is detachably coupled, as at 244, to the lower end of a shaft 245, which extends upwardly and is reciprocably guided in a cross bar 246 that forms a part of the box shaped frame 229. The upper end of the rod 245 is flexibly coupled to the outer extremity of a lever 247, which is pivotally mounted on a cross shaft 248 that is carried by the frame 229. The gate 240 is normally held in its upper position—to permit the molten glass to flow freely from the forehearth 210 through the ports 218 into the passageway 217—by a cam 249, on the cam shaft 235, which engages a roller 250 that is carried by a stud bolt bearing 251 on the lever arm 247. The cam 249 is so shaped and adjusted as to permit the connected lever-gate assembly 247—245—242—240 to drop under its own weight, and cover the ports 218, when the cam 234 initiates the downward movement of the plunger 220.

In order that the plunger 220 will apply a force to the glass in one direction only and thereby avoid any retardation or retraction of the flow of the glass through the orifice on its upward movement—such as always occurs in the operation of the present types of sticky plunger feeders—the cams 234 and 249 are preferably so formed and so set in relation to each other that the plunger will remain in its lower position until the gate 240 has been raised to reestablish the flow of molten glass from the forehearth to the interior of the sleeve 216. As the level of glass rises in the sleeve, it will "float" the plunger 220 to its raised position;—this upward floating movement being assisted by a weight 252, which is attached to the inner end of the lever 231, and which can be adjusted so as to counterbalance a part of the weight of the plunger and also assist in overcoming any frictional resistance to its upward movement.

In order to assist the plunger in expelling the glass during its downward movement, I preferably employ a bearing sleeve which is of somewhat greater diameter than the plunger itself; and when their connected parts are depressed the air which is trapped between the enlarged upper portion of the member 222 and the glass in the interior of the sleeve 216 is subjected to compression, and this supplements the expulsive action of the plunger itself. In order to avoid any possible rarefication of the trapped air during the reverse upward (floating) movement of the parts, the annular space between the plunger and its enclosure, sleeve 213 is connected with a passageway 255, in the housing 225, which is provided with a sensitive control valve 254 that will open automatically to the atmosphere when the pressure within the sleeve drops below a predetermined amount.

From this construction it is apparent that when the gate 240 is raised, molten glass will flow freely from the forehearth through the ports 218 into the passageway 217 and then through the ports 219 into the interior of the sleeve 216 and also through the orifice 215. Since the area of the orifice is materially less than the area of the passageway 217, and since the glass therein is under a relatively high gravity head, the glass will quickly rise in the sleeve 216 and float the plunger upwardly; and as a result, the plunger does not impart any retarding or retracting force to the gravity flow through the orifice.

To maintain the glass in the delivery passageways and chambers at the desired working temperature, combustible fuel is introduced into the sub-forehearth through suitable ports 256 by mixing burner 256a that are preferably arranged as shown in the cross sectional views of Figs. XVIII and XIX, and which are fed by the fuel pipes 257. The gases of combustion pass tangentially around the cylindrical member 213 and upwardly into the main forehearth 210 and thence back into the melting furnace or tank.

The shear mechanism disclosed in Figs. XVII, XVIII, XIX and XX is similar to the mechanism shown in Figs. XII, XIII, XIV and XV, and differs therefrom only in a few minor details of structure. The shear mechanism illustrated in these figures is operated by a turbine rotor 260 which is secured to the shaft 261, and is continuously driven by compressed air introduced into the rotor chamber through a pipe 262 leading from the hollow mandrel 109'. The shaft 261 carries the clutch element 176.

The clutch elements are normally held in released or disengaged position by the bellows 178 which is supplied with air through the pipe 182 which in this construction communicates with a port 263 in the side of the hollow mandrel 109'. In order to engage the clutch elements 175—176 to rotate the sleeve 159 and close the shear blades 154—154', a valve 265 is positioned in the hollow mandrel 109' and is adapted to be momentarily closed at regular intervals to shut off the supply of air to the bellows 178. The valve 265 is normally held in its open or unseated position by the pressure of the air in the mandrel 109', and is provided with a stem 266 which extends beyond the end of the mandrel, and carries a disc valve 267 for closing the atmospheric vent port 268 at the outer end thereof. The projecting end of the stem 266 is connected to one end of a lever 269 which is centrally pivoted on a bracket 270 that forms a part of the mandrel support 271. The other end of the lever 269 carries a roller 272 which is engaged by a face cam 273, that is carried by a worm wheel 274. The connected elements 273—4, are rotatably mounted on a stud bolt 275 and are continuously driven from the motor shaft 239, through a worm 276.

The stream of glass is severed into mold charges in timed relation to the movements of the plunger 220, and when the apparatus is in operation, the continuously revolving face cam 273 is adjusted to close the valve 265 at or about the time when the plunger 220 has reached the end of its own stroke and the gate valve 240 has been raised to permit the glass to flow by gravity into the plunger chamber and float the latter upwardly. The closing of the valve 265 concurrently opens the disc valve 267 and permits the air in the bellows 178 to escape to atmosphere. When this occurs the bellows 178 collapses, and the spring member 178 rocks the lever 177 and moves the clutch element 175 into engagement with the clutch element 176 on the rotor driven shaft 261. This engagement of the clutch elements rotates the sleeve 159 and advances the shear blades 154—154' toward each other. At the same time, the eccentric sleeve 168 bearing against the roller 196 moves the blades towards the orifice and the eccentric sleeve is so shaped that the blades reach their highest position as they enter the stream of glass.

Further rotation of the sleeve 159 completely closes the shear blades and causes them to travel with the stream during the severing operation.

After the cut has been made, the rotation of the sleeve is stopped by opening the valve 192 which admits compressed air into and expands the bellows 178.

From the foregoing description it is apparent that I have provided an improved feeder of the forced flow type in which the applied forces act in one direction only; and as a result, there is no retarding or retraction of the flow, in the intervals between such applications. On the contrary, a continuous high speed gravity flow is always maintained by reason of the relatively high head of glass maintained in the sub-forehearth; and this flow is preferably accelerated by the application of a supplemental extruding or expelling force that swells the stream to form a regularly recurrent series of enlarged sections that are connected by portions of lesser diameter. But these smaller sections are not produced by the action of any retardant or retractive forces, but are the result of a "natural necking" in the glass which is caused by the decreased gravity flow through the orifice, between the times of forced or accelerated flow and by the fact that the depending glass below the orifice tends to pull away faster than the gravity flow can maintain the area of the stream or can follow the sag of the depending portion thereof. Since the continuous flow of glass through the orifice is never arrested or retarded, there is no loss of time between the formation of the successive mold charges; and consequently, I am able to deliver these charges at a much higher speed than is possible with the ordinary types of plunger and air feeders now in general use, and also avoid any chilling or other detrimental effect that attends the temporary stoppage or reversal of the outflow from the delivery orifice.

With the increased speed of operation which is characteristic of the present invention, the continuously flowing stream of glass must be cut in such a way to avoid any "piling up" of the material on the shear blades; and I avoid any such action by moving the shear blades downwardly with the stream while they are also rotating about the stream as an axis; and as a result of these combined movements, each element of the cutting edges follows a three dimensional spiral path as they pass through the glass. The downward movement of the blades with the stream, during the cutting operation, tends to assist the oncoming flow, and also to accelerate the delivery of the severed gob to the mold of the forming machine; and the rotational movement of the blades around the axis of the stream, avoids localized lateral pinching and flattening out of the soft plastic material, and produces, in consequence, a smoother and more symmetrical cut or severance; and a more rounded, and less distorted or deformed contour, of the severed ends.

While I have illustrated several modifications of apparatus for carrying out my method of feeding and severing molten glass, it is understood that various other apparatus may be used without departing from the spirit of my invention or the scope of the appended claims.

What I claim as new and desire to secure by Letters Patent is:

1. A glass feeder comprising a receptacle for molten glass terminating in a chamber having its floor disposed substantially lower than the bottom of said receptacle, a discharge outlet in the floor of said chamber, a member within said chamber and having a passage therein communicating at one end with said receptacle and at the other end with said outlet for maintaining a column of glass over said outlet, a chamber within said member for accumulating a supplemental supply of glass above said orifice, means for periodically closing the upper end of said passage to segregate said column from said receptacle, and means operating in timed relation to said passage closing means for expelling said supplemental supply from said last mentioned chamber through said orifice while said passage is closed to prevent the displacement of the column of glass over the orifice.

2. The combination in a feeder for molten glass comprising a container for molten glass, a subcontainer having its floor disposed in a plane a substantial distance below the bottom of the container and having a flow orifice therein, a member in said subcontainer having a U-shaped passage therein in open communication at its base with said orifice and with one leg communicating with the container, said passage having a substantially greater sectional area than the area of the orifice whereby glass is delivered to the orifice faster than it can pass therethrough with the excess rising in the other leg of the passage, means for periodically introducing fluid pressure into said passage to expel the excess glass therein through the orifice and accelerate the flow therethrough, means for closing said passage, and means for actuating the pressure introducing means and said passage closing means in timed relation to each other.

3. Apparatus for feeding molten glass comprising a container and a sub-container having its floor spaced a substantial distance below the floor of said container, a sleeve member positioned in said sub-container with its upper end projecting above the level of the glass in said container, a bushing having an orifice therein mounted in said sleeve, said sleeve having a portion thereof cut away adjacent said container to establish communication between said container and the interior of said sleeve, the area of said sleeve being substantially greater than the area of said orifice whereby the molten glass is delivered thereto faster than it can traverse the same, means within said sleeve for accumulating the excess glass delivered to the orifice, and means for periodically forcing the accumulated excess glass through said orifice to accelerate the flow therethrough.

4. A glass feeding apparatus comprising a container for molten glass, a hollow member adjacent the outer end of said container and extending a substantial distance above the molten glass in said container and a substantial distance below the bottom of said container, said member having a portion of its wall adjacent the container cut away to establish communication between the interior of said member and said container, a bushing having a flow orifice therein mounted in the lower end of said hollow member, a vertically reciprocating member for closing communication between said container and said member on the upward movement of the reciprocating member, means for reciprocating said reciprocating member, and means for applying an expelling force to the glass in said member.

5. A glass feeding apparatus comprising a container for molten glass, a hollow member positioned adjacent the outer end of said container and extending a substantial distance below the bottom thereof, said member communicating at its upper end with the container and at its lower end with a discharge outlet and having an area substantially greater than the area of the discharge outlet whereby glass is delivered to the outlet faster than it can traverse the same, and a column of glass is thereby maintained above the outlet, means associated with said member for accumulating the excess glass delivered to said outlet, a reciprocating valve for closing communication between said member and said container, means for reciprocating said valve, and means responsive to the reciprocation of said valve for applying an expelling force to the accumulated glass to accelerate the flow through the outlet.

6. A glass feeder comprising a forehearth for molten glass, a subforehearth depending from said forehearth and having an outlet therein, a member positioned in said subforehearth and having a chamber therein communicating with said outlet and a passageway connecting said container with said outlet and with said chamber, means for periodically closing said passageway to shut off communication between said forehearth and said outlet, a reciprocable plunger extending into said chamber, means for periodically moving said plunger toward the orifice to apply an expelling force to the glass in said chamber, means associated with the plunger for compressing the air in said chamber on the downward movement thereof and supplement the expulsive action of said plunger, and means for automatically connecting the interior of the chamber to atmosphere to prevent rarefaction of the air in said chamber on the upward movement of said plunger.

7. A glass feeder comprising a forehearth for molten glass, a subforehearth depending from said forehearth and having an orifice in the bottom thereof, a sleeve positioned in said subforehearth over said orifice and providing a chamber in said subforehearth, means for delivering molten glass from said forehearth to said chamber, means for periodically closing communication between said forehearth and said chamber, a plunger reciprocably mounted in said chamber, means for periodically moving said plunger toward the orifice to expel the glass in said chamber therethrough, and means associated with said plunger for building up a fluid pressure in said chamber on the downward movement thereof.

8. A glass feeder comprising a forehearth for molten glass, a subforehearth depending from said forehearth and having an outlet in the floor thereof, a sleeve positioned in said subforehearth and forming a chamber over said orifice, a sleeve surrounding said first-mentioned sleeve and spaced therefrom to provide a passageway therebetween, said last-mentioned sleeve communicating at one end with the material in said forehearth and at the opposite end with said first-mentioned sleeve, means for periodically closing said passageway, a plunger reciprocably mounted in said inner sleeve, means for moving said plunger toward said outlet to expel the glass therein therethrough, and means for connecting the interior of the inner sleeve to atmosphere to prevent rarefaction of the air therein on the upward movement of the plunger.

9. A glass feeder comprising a forehearth for molten glass, a subforehearth depending from said forehearth and having an outlet in the floor thereof, a sleeve positioned in said subforehearth and forming a chamber over said orifice, a sleeve surrounding said first-mentioned sleeve and spaced therefrom to provide a passageway therebetween, said last-mentioned sleeve communicating at one end with the material in said forehearth and at the opposite end with said first-mentioned sleeve, means for periodically closing said passageway, a plunger reciprocably mounted in said inner sleeve, and means for moving said plunger toward said outlet to expel the glass therein therethrough.

10. A glass feeder comprising a forehearth for molten glass, a subforehearth depending from said forehearth, a vertically extending sleeve in said subforehearth and having a port communicating with the material in said forehearth, a sleeve disposed within said first-mentioned sleeve and spaced therefrom to provide a chamber therebetween, said inner sleeve being positioned over a delivery outlet and in communication with the chamber between said sleeves, means for periodically closing the port in said outer sleeve, and means for periodically applying an expelling force to the glass in said inner sleeve.

11. A glass feeder comprising a container for molten glass, a chamber adjacent said container and having a floor spaced below the bottom of said container, a sleeve positioned in said chamber and communicating at its upper end with the material in said forehearth and at its lower end with a delivery outlet, said sleeve being spaced from the walls of said chamber to provide a heating space therebetween, a reciprocable member projecting into the material within said sleeve and having a cavity therein located below the level of the glass in said container, means for reciprocating said member, means for periodically connecting said cavity to a source of fluid pressure, and means responsive to the glass level within said cavity for trapping a predetermined quantity of elastic fluid therein.

12. A glass feeder comprising a container for molten glass, a chamber adjacent said container and having a floor spaced below the bottom of said container, a sleeve positioned in said chamber and spaced from the walls of said chamber to provide a heating space therebetween, said sleeve communicating at its upper end with the material in said forehearth and at its lower end with a delivery outlet, a member projecting into the material within said sleeve and having a cavity therein in open communication with the glass in said sleeve and located below the level of the glass in said container, means for periodically connecting said cavity to a source of fluid pressure to expel the glass therein through the orifice, and means responsive to the glass level within said cavity for shutting off the flow thereto to prevent the overfilling thereof.

13. A glass feeder comprising a container for molten glass, a sleeve communicating at its upper end with the material in said container and at its lower end with a discharge outlet, a heating chamber surrounding said sleeve, a bell reciprocably mounted in said sleeve, means for reciprocating said bell, a shoulder on said bell adapted when in one position to cooperate with a shoulder on said sleeve and close communication between the container and the sleeve, and means for periodically connecting the interior of said bell to a source of fluid pressure.

14. A glass feeder comprising a container for molten glass, a sleeve adjacent said container and having one end communicating with the material in the container and the other end communicating with a discharge outlet, a heating chamber surrounding said sleeve and opening into said container, a bell extending into said sleeve, a shoulder on said bell, means for periodically reciprocating said bell to move said shoulder into cooperating relation with a shoulder on said sleeve, and close communication between the container and the sleeve, means responsive to the movement of said bell for connecting the interior thereof to a source of fluid pressure, and means for introducing gases of combustion into said heating chamber to maintain the glass within said sleeve at the desired working temperature.

15. A glass feeder comprising a forehearth having a glass compartment and a chamber, the bottom of said chamber being located a substantial distance below the bottom of the glass compartment and having an orifice in the bottom thereof, a member in said chamber having a substantially U-shaped passage therein communicating at the upper end of one leg with the glass compartment of said forehearth and at the base portion thereof with the orifice, the sectional area of said passage being substantially greater than the area of said orifice, whereby glass is delivered to the orifice faster than it can traverse the same with the excess rising in the other leg of the passage, means for closing communication between the passage and the glass compartment of said forehearth, and means for applying an expelling pressure to the molten glass contained within one leg of such U-shaped passage.

16. A method of feeding molten glass from a container through an orifice remote therefrom, which consists in establishing a gravity flow from the container to the orifice and delivering molten glass to the orifice faster than it can traverse the same, maintaining the glass at the orifice under the expelling force of a substantial and constant head of glass, accumulating a predetermined portion of the excess glass delivered to the orifice in a segregation chamber in communication with the orifice, periodically applying an expelling force to the glass in such chamber to accelerate the flow through the orifice and closing communication between the container and the orifice during the period of accelerated flow to prevent the displacement of the head of glass.

17. A method of feeding molten glass from a container through an orifice remote therefrom which consists in establishing a gravity flow of molten glass from the container to the orifice and delivering glass to the orifice faster than it can traverse the same, maintaining the glass at the orifice under the expelling force of a substantial and constant head of glass, accumulating the excess glass delivered to the orifice in a segregation chamber in communication with the orifice and located entirely below the level of glass in said container, trapping a quantity of elastic fluid within said chamber in response to the glass level therein to shut off the flow of glass into said chamber and periodically connecting the chamber to a source of fluid pressure to accelerate the glass flow through the orifice while preventing the displacement of the head of glass.

18. A glass feeder comprising a container for molten glass having an orifice in the bottom thereof, a sleeve positioned in said container surrounding said orifice and communicating with said container, a plunger movable in said sleeve, means for reciprocating said plunger, means associated with said plunger for compressing the air within said sleeve on the downward movement thereof, and means for automatically connecting the interior of said sleeve to atmosphere to prevent rarefaction of the air in said sleeve on the upward movement of said plunger.

FRANK L. O. WADSWORTH.